United States Patent
Rangarajan et al.

(10) Patent No.: US 11,880,454 B2
(45) Date of Patent: Jan. 23, 2024

(54) ON-DIE VOLTAGE-FREQUENCY SECURITY MONITOR

(71) Applicant: QUALCOMM Incorporated, San Diego, CA (US)

(72) Inventors: Bharat Kumar Rangarajan, Bangalore (IN); Dipti Ranjan Pal, Irvine, CA (US); Keith Alan Bowman, Morrisville, NC (US); Srinivas Turaga, Bangalore (IN); Ateesh Deepankar De, Bangalore (IN); Shih-Hsin Jason Hu, San Diego, CA (US); Chandan Agarwalla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 16/874,538

(22) Filed: May 14, 2020

(65) Prior Publication Data
US 2021/0357502 A1    Nov. 18, 2021

(51) Int. Cl.
*G06F 21/55* (2013.01)
*G06F 1/26* (2006.01)

(52) U.S. Cl.
CPC .............. *G06F 21/554* (2013.01); *G06F 1/26* (2013.01); *G06F 2221/034* (2013.01)

(58) Field of Classification Search
CPC ..... G06F 21/554; G06F 1/26; G06F 2221/034
See application file for complete search history.

(56) References Cited

U.S. PATENT DOCUMENTS

| | | | |
|---|---|---|---|
| 8,943,334 B2 * | 1/2015 | Kumar | G06F 1/3296 713/320 |
| 9,413,344 B2 | 8/2016 | Bowman et al. | |
| 10,598,729 B1 * | 3/2020 | Jennings | H03M 1/1042 |
| 2004/0085085 A1 | 5/2004 | Muhtaroglu et al. | |
| 2009/0049548 A1 * | 2/2009 | Garbe | G06F 21/554 711/159 |
| 2009/0261856 A1 * | 10/2009 | Kwean | G11C 29/028 326/30 |
| 2012/0249170 A1 | 10/2012 | Baumann et al. | |

(Continued)

OTHER PUBLICATIONS

Bowman K.A., et al., "A 16 nm All-Digital Auto-Calibrating Adaptive Clock Distribution for Supply Voltage Droop Tolerance Across a Wide Operating Range", IEEE Journal of Solid-State Circuits, Jan. 2016, vol. 51, No. 1, pp. 8-17.

*Primary Examiner* — Peter C Shaw
*Assistant Examiner* — Zhe Liu
(74) *Attorney, Agent, or Firm* — Qualcomm Incorporated/Seyfarth Shaw LLP (57) ABSTRACT

A method to prevent a malicious attack on CPU subsystem (CPUSS) hardware is described. The method includes auto-calibrating tunable delay elements of a dynamic variation monitor (DVM) using an auto-calibration value computed in response to each detected change of a clock frequency (Fclk)/supply voltage (Vdd) of the CPUSS hardware. The method also includes comparing the auto-calibration value with a threshold reference calibration value to determine whether the malicious attack is detected. The method further includes forcing a safe clock frequency (Fclk)/safe supply voltage (Vdd) to the CPUSS hardware when the malicious attack is detected.

20 Claims, 7 Drawing Sheets

(56) References Cited

U.S. PATENT DOCUMENTS

| | | | |
|---|---|---|---|
| 2014/0253189 A1* | 9/2014 | Sadowski | G06F 1/3203 |
| | | | 327/141 |
| 2016/0033576 A1 | 2/2016 | Turullols et al. | |
| 2017/0357829 A1* | 12/2017 | Park | G06F 21/86 |
| 2018/0004944 A1 | 1/2018 | Nagata et al. | |
| 2019/0041440 A1 | 2/2019 | Duggal et al. | |
| 2019/0095564 A1* | 3/2019 | Atsatt | G06F 30/34 |
| 2019/0138754 A1* | 5/2019 | Koay | G06F 1/08 |
| 2019/0172047 A1* | 6/2019 | Tan | G06Q 20/40145 |
| 2019/0303624 A1* | 10/2019 | Moss | G06F 21/72 |
| 2020/0004990 A1* | 1/2020 | Kurd | G06F 1/06 |
| 2020/0104537 A1* | 4/2020 | Rosay | G06F 21/81 |
| 2020/0159278 A1* | 5/2020 | Pereira | H03L 7/0991 |
| 2020/0226295 A1* | 7/2020 | Patel | H03K 5/00 |
| 2020/0402929 A1* | 12/2020 | Lentz | H03K 5/00 |
| 2021/0004461 A1* | 1/2021 | Guilley | H01L 23/576 |
| 2021/0148957 A1* | 5/2021 | Tuncer | G06F 21/755 |
| 2021/0191452 A1* | 6/2021 | Herberholz | G06F 30/3312 |
| 2021/0294410 A1* | 9/2021 | Rajpathak | G06F 21/556 |

* cited by examiner

ON-DIE VOLTAGE-FREQUENCY SECURITY MONITOR

BACKGROUND

Field

The present disclosure generally relates to cyber security. More specifically, aspects of the present disclosure relate to an on-die voltage-frequency monitor to detect malicious attacks.

Background

Over the last decade, malicious software has become a pervasive problem for computer users. In particular, one type of malware may exhibit behaviors such as infecting, encrypting, deleting, and/or stealing files (hereinafter generally referred to as "file altering malware"). File altering malware targets computer systems for: (i) restricting access to portions of a computer system and demanding payment for the removal of the restriction, or (ii) infecting computer systems with information theft routines, which may seek to steal information such as (1) login credentials to applications, (2) system information, (3) file transport protocol (FTP) credentials, or the like.

Infecting malware may target a computer architecture, such as a high-level operating system (HLOS) of the computer architecture. Unfortunately, malware detection systems for preventing infecting malware have difficulty detecting that a computer architecture is affected by the infecting malware. This difficulty in detection occurs because non-malicious applications may affect the computer architecture in a manner similar to the infecting malware. Therefore, current malware detection systems may fail to prevent the infecting malware from using the HLOS to negatively alter the computer architecture and cause device failure.

SUMMARY

A method to prevent a malicious attack on CPU subsystem (CPUSS) hardware is described. The method includes auto-calibrating tunable delay elements of a dynamic variation monitor (DVM) using an auto-calibration value computed in response to each detected change of a clock frequency (Fclk)/supply voltage (Vdd) of the CPUSS hardware. The method also includes comparing the auto-calibration value with a threshold reference calibration value to determine whether the malicious attack is detected. The method further includes forcing a safe clock frequency (Fclk)/safe supply voltage (Vdd) to the CPUSS hardware when the malicious attack is detected.

A non-transitory computer-readable medium having program code recorded thereon to prevent a malicious attack on CPU subsystem (CPUSS) hardware is described, in which the program code is executed by a processor. The non-transitory computer-readable medium includes program code to auto-calibrate tunable delay elements of a dynamic variation monitor (DVM) using an auto-calibration value computed in response to each detected change of a clock frequency (Fclk)/supply voltage (Vdd) of the CPUSS hardware. The non-transitory computer-readable medium also includes program code to compare the auto-calibration value with a threshold reference calibration value to determine whether the malicious attack is detected. The non-transitory computer-readable medium further includes program code to force a safe clock frequency (Fclk)/safe supply voltage (Vdd) to the CPUSS hardware when the malicious attack is detected.

A voltage-frequency security monitor (VFSM) to prevent a malicious attack on CPU subsystem (CPUSS) hardware is described. The VFSM includes a dynamic variation monitor (DVM) comprising tunable delay elements. The VFSM also includes an auto-calibration circuit configured to auto-calibrate the tunable delay elements of the DVM according an auto-calibration value computed in response to each detected change of a clock frequency (Fclk)/supply voltage (Vdd) of the CPUSS hardware. The VFSM further includes a controller configured to to compare the auto-calibration value with a threshold reference calibration value to determine whether the malicious attack is detected, and configured to force a safe clock frequency (Fclk)/safe supply voltage (Vdd) to the CPUSS hardware when the malicious attack is detected.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily used as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

As described herein, the use of the term "and/or" is intended to represent an "inclusive OR," and the use of the term "or" is intended to represent an "exclusive OR." The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Infecting malware may target a computer architecture, such as a high-level operating system (HLOS) of the computer architecture. Unfortunately, malware detection systems for preventing infecting malware have difficulty detecting that a computer architecture is affected by the infecting malware. This difficulty in detection occurs because non-malicious applications may affect the computer architecture in a similar manner to the infecting malware. That is, non-malicious applications may affect the computer architecture in a manner similar to the infecting malware. Therefore, current malware detection systems may fail to prevent the infecting malware from using the HLOS to negatively alter the computer architecture to cause intentional failure.

A method to prevent a malicious attack on a central processing unit subsystem (CPUSS) hardware is described, according to aspects of the present disclosure. The method includes auto-calibrating tunable-delay elements of a dynamic variation monitor (DVM) after each detected change of a clock frequency (Fclk)/supply voltage (Vdd). The method also includes comparing the changed clock frequency (Fclk)/supply voltage (Vdd) with a reference calibration value to determine whether a malicious attack is detected. The method further includes forcing a safe clock frequency/safe supply voltage Vdd if a malicious attack is detected.

Figure 1:
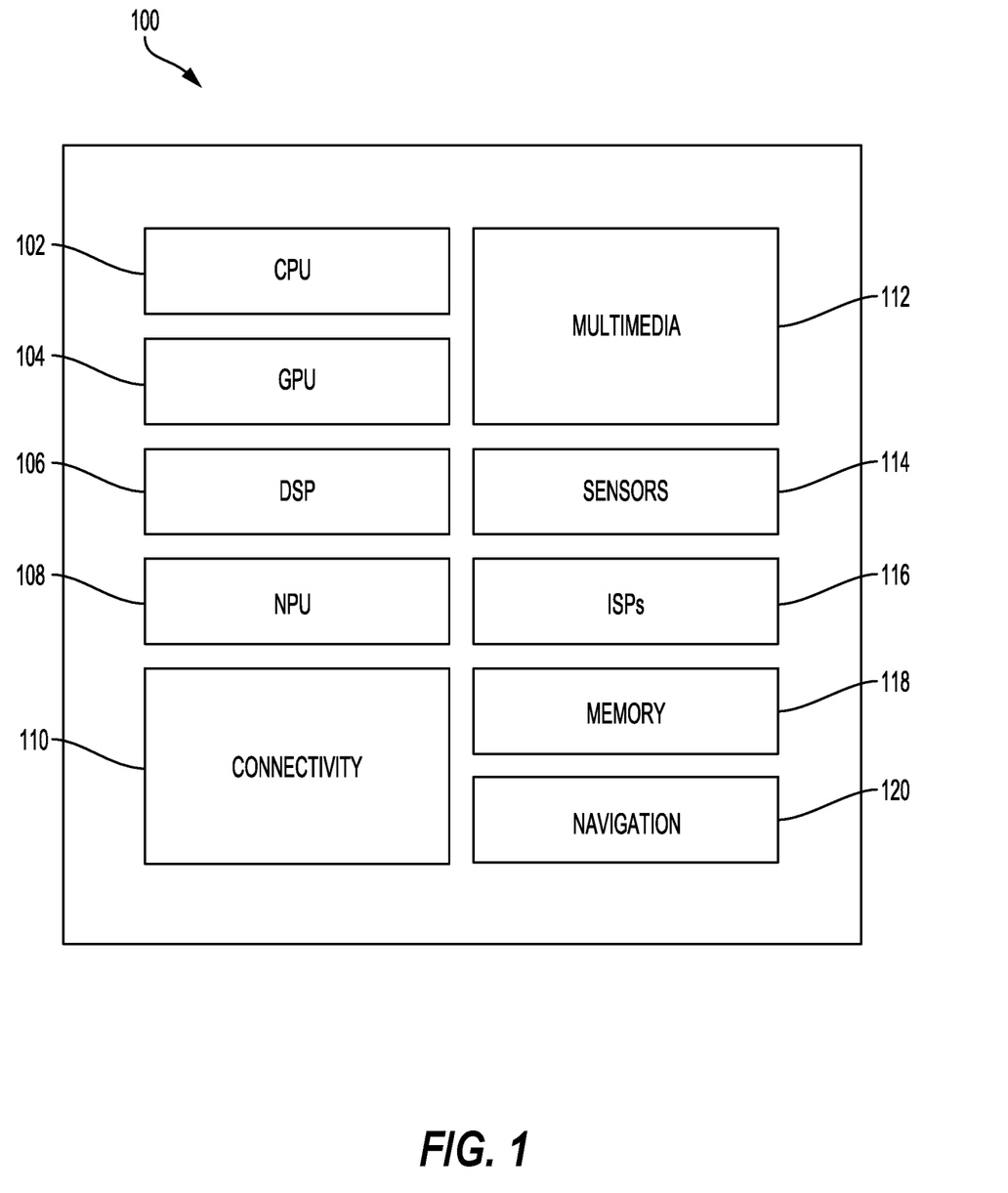
FIG. 1 illustrates an example implementation of a system-on-a-chip (SOC), including a voltage-frequency security monitor (VFSM), in accordance with certain aspects of the present disclosure.

FIG. 1 illustrates an example implementation of a host system-on-a-chip (SOC) 100, which includes a voltage-frequency security monitor (VFSM), configured to prevent a malicious attack on central processing unit subsystem (CPUSS) architecture, in accordance with aspects of the present disclosure. The host SOC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, USB connectivity, Bluetooth® connectivity, Secure Digital (SD) connectivity, and the like.

In this configuration, the host SOC 100 includes various processing units that support multi-threaded operation. For the configuration shown in FIG. 1, the host SOC 100 includes a multi-core central processing unit (CPU) 102, a graphics processor unit (GPU) 104, a digital signal processor (DSP) 106, and a neural processor unit (NPU) 108. The host SOC 100 may also include a sensor processor 114, image signal processors (ISPs) 116, a navigation module 120, which may include a global positioning system, and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advance RISC machine (ARM), a microprocessor, or some other type of processor. The NPU 108 may be based on an ARM instruction set.

In an aspect of the present disclosure, the instructions loaded into the multi-core CPU 102 may include program code to auto-calibrate tunable-delay elements of a dynamic variation monitor (DVM) using an auto-calibration value computed in response to each detected change of a clock frequency (Fclk)/supply voltage (Vdd) of the CPUSS hardware. The instructions loaded into the multi-core CPU 102 may also include program code to compare the auto-calibration value with a threshold reference calibration value to determine whether the malicious attack is detected. In addition, the instructions loaded into the multi-core CPU 102 may include program code to force a safe clock frequency (Fclk)/safe supply voltage (Vdd) to the CPUSS hardware when the malicious attack is detected.

Figure 2:
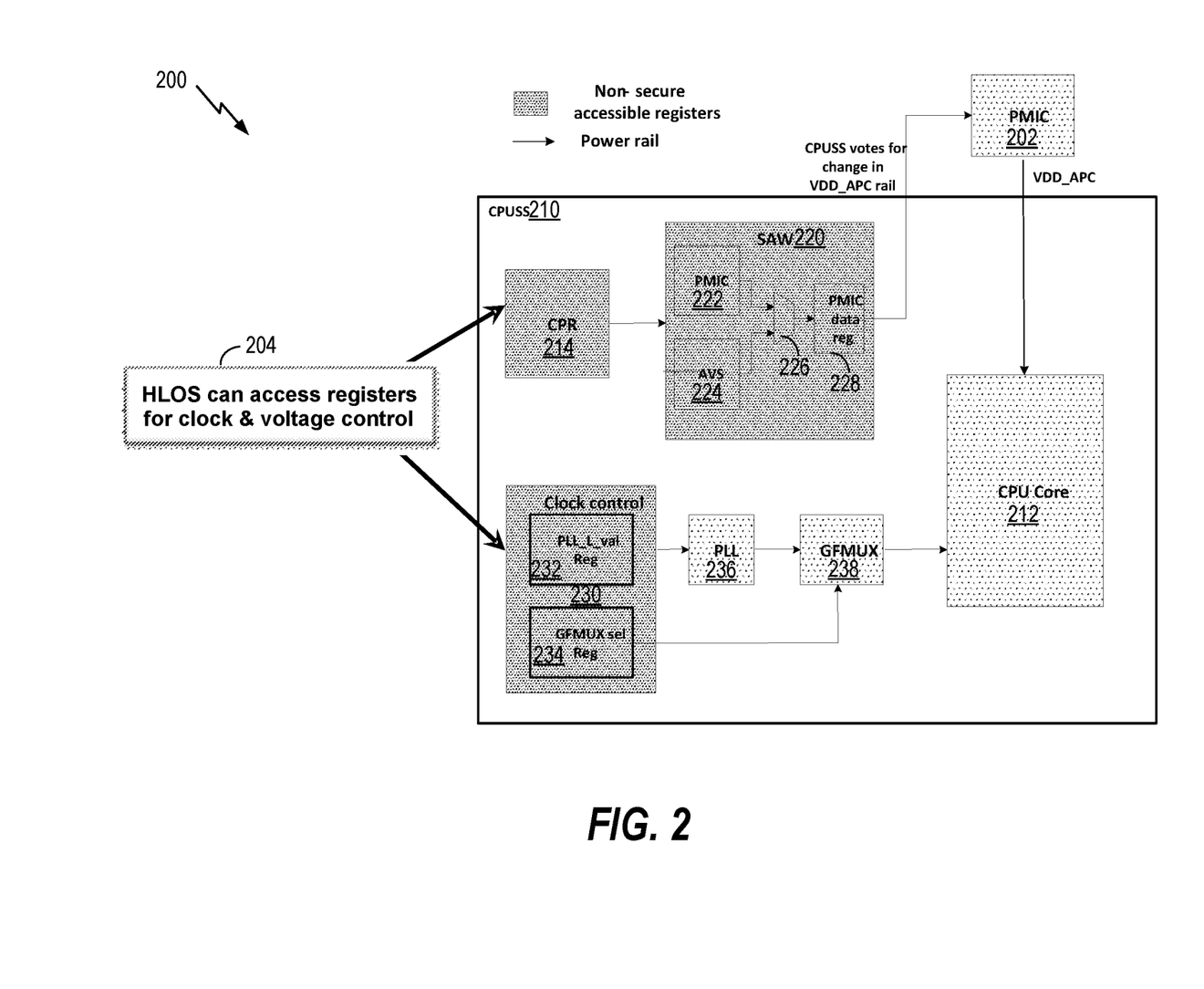
FIG. 2 is a block diagram of a central processing unit subsystem (CPUSS) hardware, in accordance with aspects of the present disclosure.

FIG. 2 is a block diagram of a processor architecture having a central processing unit subsystem (CPUSS), in accordance with aspects of the present disclosure. A CPUSS architecture 200 includes a CPUSS 210 shown in communication with a power management integrated circuit (PMIC) 202 to provide a supply voltage (e.g., VDD_APC) to a CPU core 212 of the CPUSS 210. The CPUSS 210 also includes a core power reduction (CPR) block 214 in communication with a subsystem power manager and adaptive voltage scaling wrapper (SAW) 220. The SAW 220 includes a PMIC 222 and an adaptive voltage scaling (AVS) block 224 coupled to a logic block 226 to store a value in a PMIC data register 228. The SAW 220 and the CPR block 214 are configured to trigger changes to an application processor core (APC) supply voltage (e.g., VDD_APC) rail.

The CPUSS 210 also includes a clock control block 230, including a phase locked loop (PLL) value register 232 and a glitch free multiplexor (GFMUX) selection register 234. The PLL value register 232 is coupled to a PLL 236, and the GFMUX selection register 234 is coupled to a GFMUX 238, which is also coupled to the PLL 236. In this configuration, the GFMUX 238, in combination with the PLL 236, is configured to provide a clock frequency (Fclk) to the CPU core 212.

According to the configuration of FIG. 2, the CPUSS 210 provides dynamic voltage-frequency scaling (DVFS) for the CPU core 212, including DVFS operations such as a clock frequency (Fclk) change and a voltage (Vdd) change. In operation, a high-level operating system (HLOS) 204 interfaces with the CPUSS 210 to change the clock frequency Fclk by controlling the PLL 236 and the GFMUX 238. In addition, the HLOS 204 interfaces with the CPUSS 210 to change the supply voltage Vdd by programming a target voltage in the CPR block 214 and the SAW 220, which communicates the target voltage to the PMIC 202.

Dynamic voltage-frequency scaling for the CPU core 212 (and other processors) to modify the voltage (Vdd) and/or the clock frequency (Fclk) is triggered by a software kernel. Modification to the voltage Vdd and/or the clock frequency Fclk depends on a current application load and a next scheduled application. Unfortunately, the clock driver as well as the voltage driver used to interface with the CPR block 214, the SAW 220, and the clock control block 230 reside in a non-secure operating system (OS) kernel, which is accessible to the HLOS 204. That is, the HLOS 204 may program the PLL value register 232 and the GFMUX selection register 234 to update the clock frequency Fclk. In addition, the HLOS 204 may program the registers of the CPR block 214 and the SAW 220 for changing the supply voltage Vdd.

Unfortunately, the dynamic voltage-frequency scaling capability of the CPUSS 210 is vulnerable to malicious software attack because the DVFS operations of the CPUSS 210 are accessible through a non-secure OS kernel. For example, attackers may access the non-secure OS kernel to modify the dynamic voltage-frequency scaling control to glitch trusted software (e.g., trust-zone (TZ) code) operation to either over clock or under volt the CPU core 212 running the trusted software. By creating a glitch, attackers can infer secret cryptographic keys stored in the trusted software, for example, by inducing faults and potentially bypassing a trusted software signature authentication process.

Figure 3:
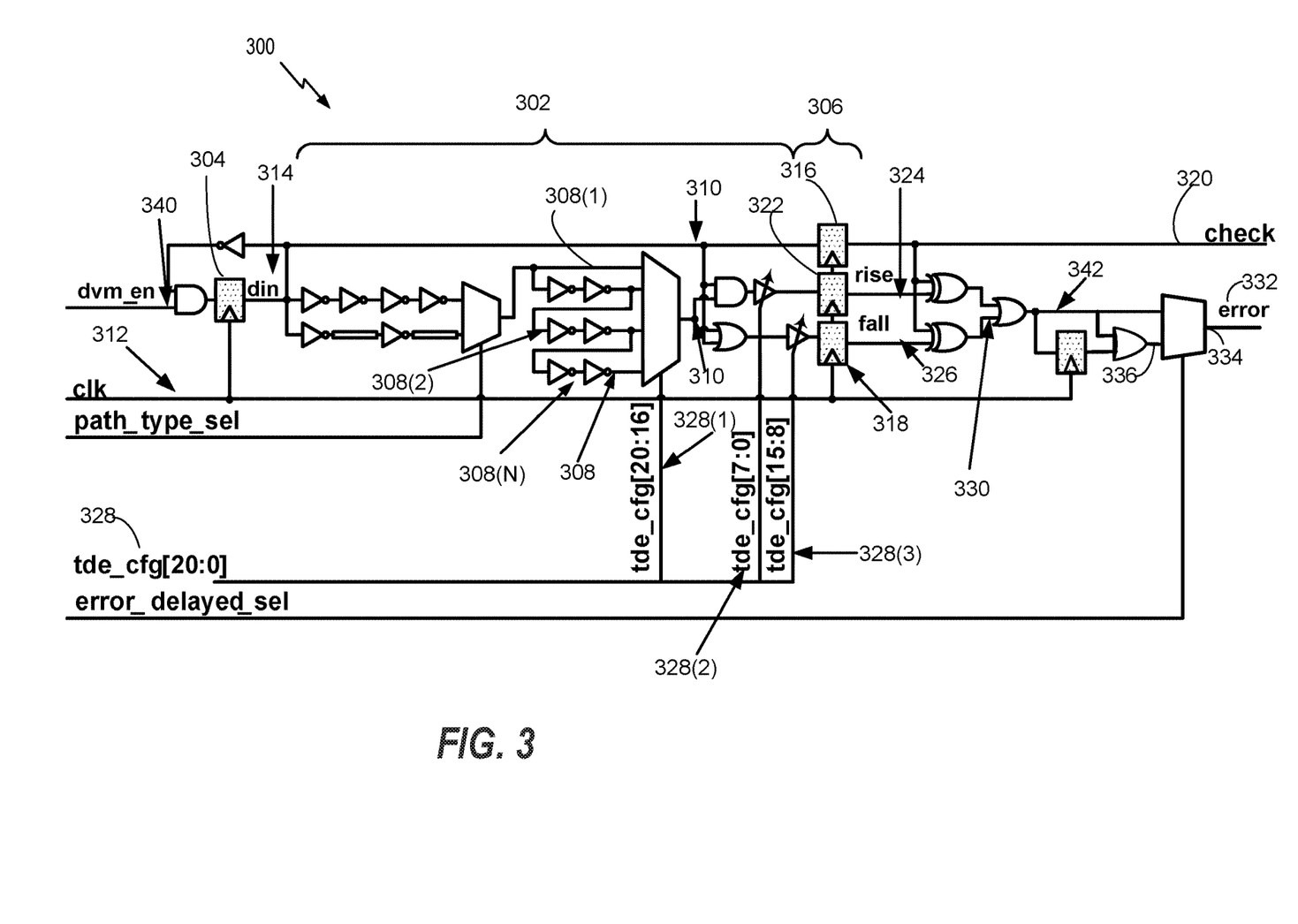
FIG. 3 is a block diagram of a configuration of a dynamic variation monitor to detect a malicious central processing unit subsystem (CPUSS) attack, in accordance with aspects of the present disclosure.

FIG. 3 is a schematic diagram of a configuration of a dynamic variation monitor (DVM) configured to detect supply voltage Vdd droop to trigger an error signal, in accordance with aspects of the present disclosure. In this configuration, a dynamic variation monitor 300 contains tunable delay elements 302 between a driving flip-flop 304 and receiving flip-flops 306. The tunable delay elements 302 include tunable delay paths 308(1)-308(N), each having a delay timing based on a critical-path delay timing in the CPU core 212. The tunable delay elements 302 are configured to delay the propagation of a data input signal 314 (din) from the driving flip-flop 304 to the inputs of the receiving flip-flops 306 by a selected tunable delay path among the tunable delay paths 308. The delay is based on a programmable delay path input 328 in the form of configuration bits.

In this example, the programmable delay path input 328 is provided as three different programmable delay path input ranges (e.g., 328(1)-328(3)), also known as configuration bits. Configuration bit 328(1), including bits 20:16 of the programmable delay path input 328 in this example, provides a coarser delay level setting of the tunable delay elements 302. Configuration bits 328(2), 328(3), including bits 15:8 and 7:0, respectively, of the programmable delay path input 328 in this example, provide a finer delay level setting for the tunable delay elements 302.

According to aspects of the present disclosure, a voltage droop detection circuit 330 generates an error current signal 342 indicating power supply voltage droop. The voltage droop detection circuit 330 is configured to generate the error current signal 342 based on timing differences between the period of an input clock signal 312 and the total path delay. For example, the total path delay includes the driving flip-flop 304 clock-to-output delay, the tunable delay elements 302, and the receiving flip-flops 306 setup time.

In operation, when an enable signal 340 (e.g., dvm_en signal) is high, the driving flip-flop 304 switches every clock cycle in response to receiving the input clock signal 312. For a rising transition on a data input (din) of the driving flip-flop 304, the data input signal 314 propagates through the tunable delay elements 302 to the input of a check flip-flop 316 and a fall flip-flop 318. The check flip-flop 316 samples the correct value of the driving flip-flop 304 output (e.g., the data input signal 314) every clock cycle of the input clock signal 312 to generate a check signal 320. During a rising transition on the data input (din), the fall flip-flop 318 samples the correct value of the input clock signal 312 to reset the fall flip-flop 318 for the next clock cycle with a falling transition on the data input signal 314. During a rising transition of the data input signal 314, the data input signal 314 propagates through the tunable delay elements 302 to a rise flip-flop 322. On the next clock cycle of the input clock signal 312, the voltage droop detection circuit 330 compares the check signal 320 with a rise signal 324 generated by the rise flip-flop 322.

It should be noted that the check signal 320 and a fall signal 326 generated by the fall flip-flop 318 are equal (e.g., logically high). If the check signal 320 and the rise signal 324 are equal, the error current signal 342 is low. If the rise signal 324 is logically low, this is an indication that the tunable delay elements 302 did not satisfy the clock cycle time of the input clock signal 312. Thus, an error current signal 342 is logically high, and an error signal 332 is generated as a logical high signal on an error signal output 334 to indicate a voltage droop in the power supply.

During this clock cycle, a falling transition occurs on the data input (din), which then quickly traverses to the inputs of the check flip-flop 316 and the rise flip-flop 322, while the data input signal 314 propagates through the tunable delay elements 302 to the fall flip-flop 318. On the next cycle of the input clock signal 312, the voltage droop detection circuit 330 compares the check signal 320 and fall signal 326. Because a late delay path could induce meta-stability on the rise signal 324 or the fall signal 326, the voltage droop detection circuit 330 provides a mode to generate the error signal 332 as a logical-OR of the error current signal 342 and the error indication signal 336 in the previous cycle.

After the programmable delay path input 328 is calibrated, the voltage droop detection circuit 330 tracks critical-path timing-margin changes due to parameter variations that can change the critical-path timings. For example, such parameter variations can be due to environmental conditions such as temperature. An error indication can be generated on the error current signal 342 by the voltage droop detection circuit 330 due to a late timing transition of the second delayed signal 310, as delayed in the tunable delay elements 302. In this case, the voltage droop detection circuit 330 also generates the voltage droop indication as the error indication signal 336 for the next clock cycle of the input clock signal 312. Thus, the voltage droop detection circuit 330 detects the onset of the power supply voltage droop to assert the error signal 332.

Figure 4:
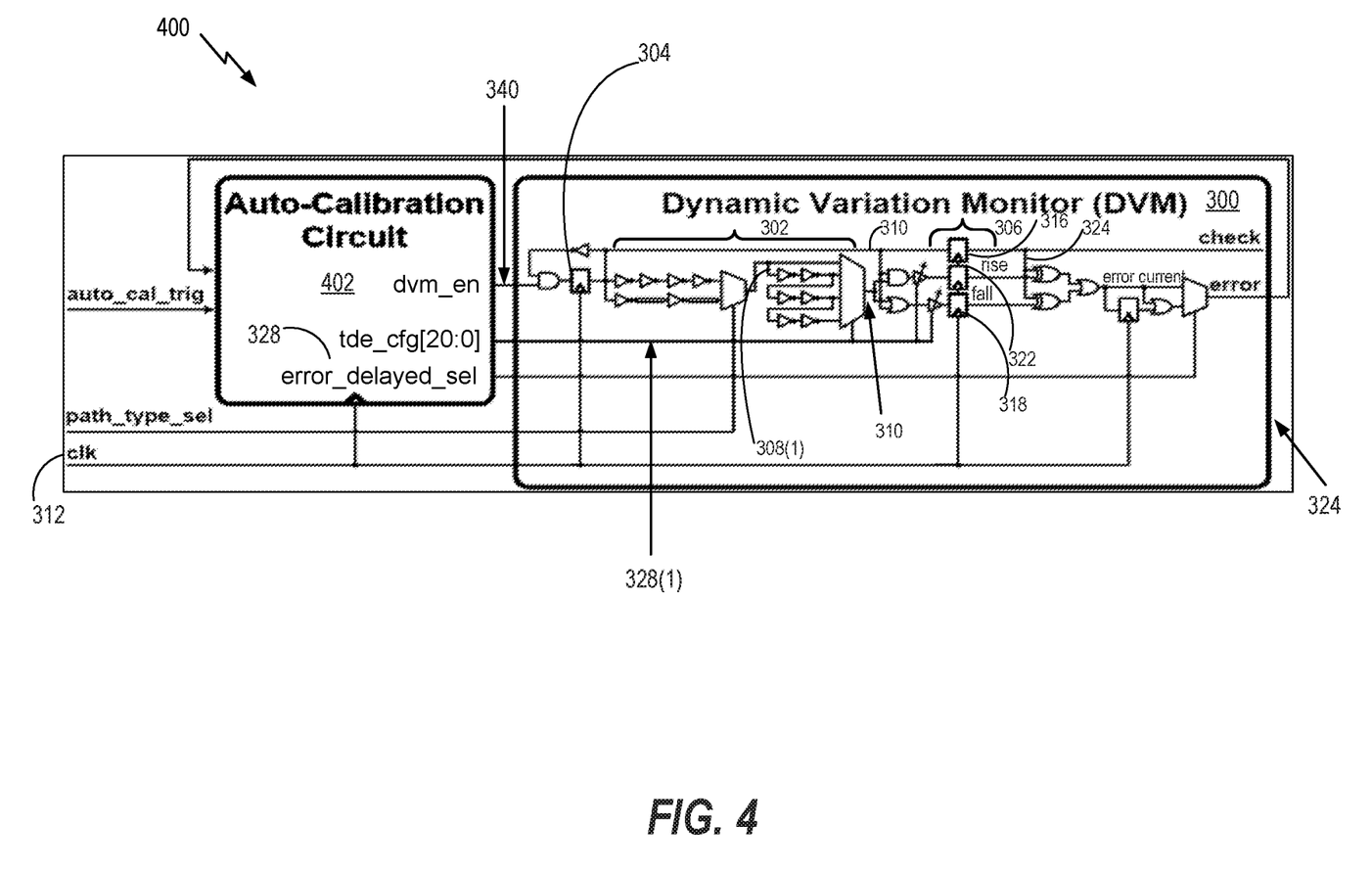
FIG. 4 is a block diagram of a configuration of an auto-calibration of a dynamic variation monitor (DVM) to prevent a malicious central processing unit subsystem (CPUSS) attack, in accordance with aspects of the present disclosure.

FIG. 4 is a block diagram of a configuration of an auto-calibration of a dynamic variation monitor (DVM), which is a component of a configuration of a voltage-frequency security monitor (VFSM), in accordance with aspects of the present disclosure. A voltage-frequency security monitor 400 includes the dynamic variation monitor 300 of FIG. 3 and an auto-calibration circuit 402. The auto-calibration circuit 402 allows for operational calibration, including but not limited to in-field operational calibration, of the critical-path delays in the tunable delay elements 302 of the dynamic variation monitor 300. This enables reduction of the timing margin of the dynamic variation monitor 300.

In aspects of the present disclosure, the auto-calibration circuit 402 configures the tunable delay elements 302 of the dynamic variation monitor 300 based on a current operating clock frequency (Fclk) and a current operating supply voltage (Vdd). The auto-calibration circuit 402 enables on-die calibration by interfacing with the dynamic variation monitor 300 to configure the tunable delay elements 302 via a DVM input register (e.g., tde_cfg[20:0]) after a clock frequency Fclk change or a supply voltage Vdd change. Common elements between the dynamic variation monitor 300 of FIG. 3 and the voltage-frequency security monitor 400 are shown in FIG. 4 with common element numbers as provided in the dynamic variation monitor 300, and thus will not be described again.

Referring again to FIG. 4, the auto-calibration circuit 402 interfaces with the dynamic variation monitor 300. In this aspect of the present disclosure, the auto-calibration circuit 402 is configured to provide the programmable delay path input 328 to the dynamic variation monitor 300 to configure the delay of the tunable delay elements 302. As a non-limiting example, this allows configuration of the dynamic variation monitor 300 during in-field operations, in lieu of or in addition to during testing of the adaptive clock distribution. According to aspects of the present disclosure, the voltage-frequency security monitor 400, using the auto-calibration circuit 402, configures the dynamic variation monitor 300 to prevent a malicious CPUSS attack, as shown in FIG. 5.

Figure 5:
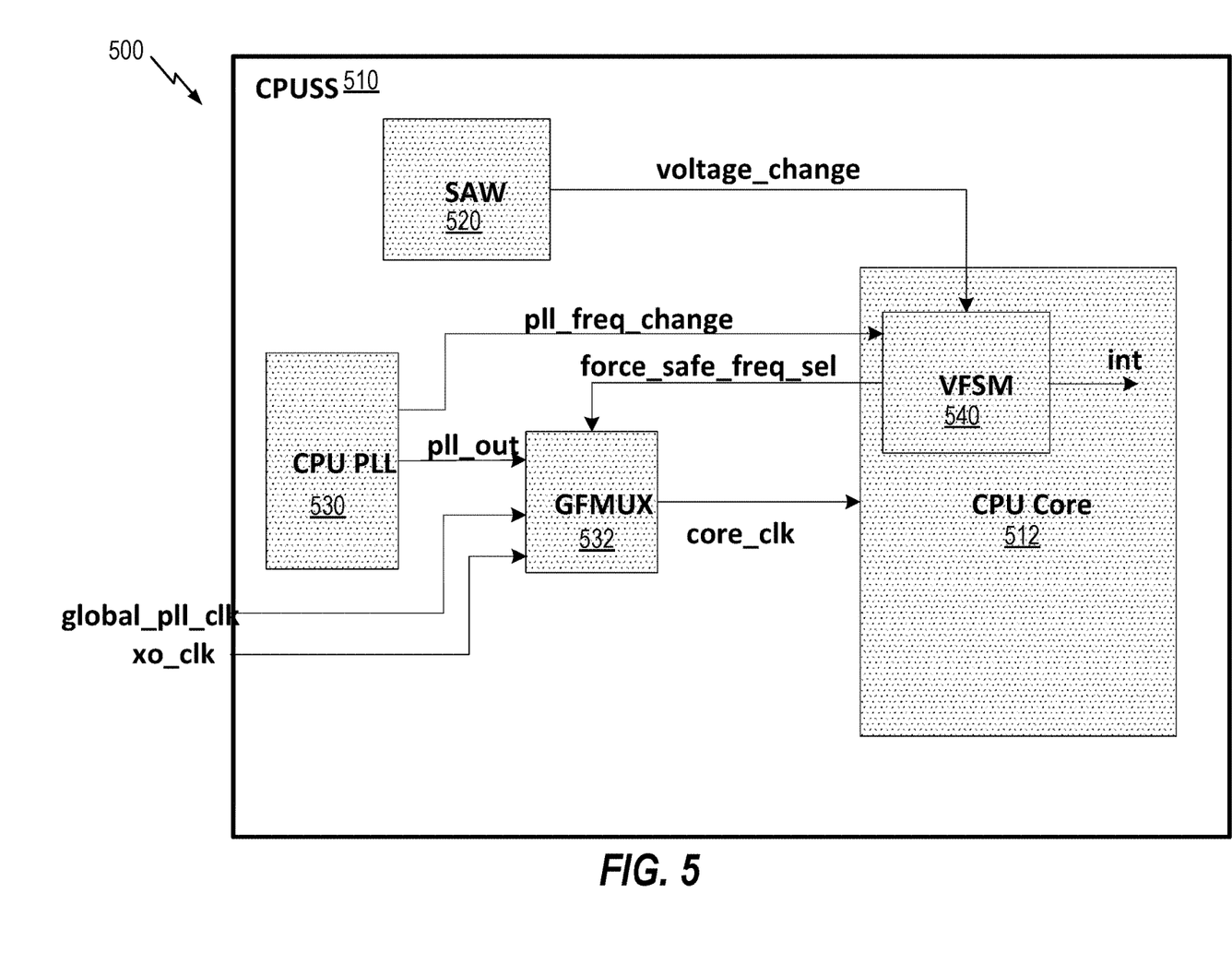
FIG. 5 is a block diagram of a configuration of the central processing unit subsystem (CPUSS) of FIG. 2, integrated with the voltage-frequency security monitor (VFSM), consisting of the dynamic variation monitor (DVM) of FIG. 3, the auto-calibration of a DVM of FIG. 4, and additional logic, in accordance with aspects of the present disclosure.

FIG. 5 is a block diagram of a processor architecture having a central processing unit subsystem (CPUSS) including a voltage-frequency security monitor (VFSM) to prevent a malicious CPUSS attack, in accordance with aspects of the present disclosure. CPUSS hardware 500 includes a CPUSS 510 having a CPU core 512. The CPUSS 510 includes a subsystem power manager and an adaptive voltage scaling wrapper (SAW) 520 in communication with a VFSM 540 of the CPU core 512. The SAW 520 is configured to trigger changes to a supply voltage rail (e.g., voltage_change).

The CPUSS 510 also includes a CPU phase locked loop (PLL) 530 and a glitch free multiplexor (GFMUX) 532. In this configuration, the GFMUX 532 receives an output PLL value (pll_out) from the CPU PLL 530, a global PLL clock (globlal_PLL_clk), and a cross clock (xo_clk). The GFMUX 532, in combination with the CPU PLL 530, is configured to provide a clock (core_clk) to the CPU core 512. In this configuration, the CPU PLL 530 is configured to notify the VFSM 540 of the CPU core 512 regarding changes to a PLL frequency (e.g., pll_freq_change). In operation, the voltage-frequency security monitor 400 interfaces with the CPU PLL 530, the GFMUX 532, and the SAW 520, which are located on die, for clock frequency Fclk and supply voltage Vdd change notifications (e.g., voltage_change and pll_freq_change signals). Registers of the voltage-frequency security monitor 400 are only accessible to trusted software.

In aspects of the present disclosure, the VFSM 540 of the CPU core 512 is configured to force a safe clock frequency (e.g., force_safe_freq_sel) to the GFMUX 532 (e.g., globlal_PLL_clk or xo_clk) if a malicious attack is detected. For example, the VFSM 540 is configured to detect attempts to lower the supply voltage Vdd below an acceptable level for a fixed clock frequency Fclk or increase clock frequency Fclk above an acceptable level for a fixed supply voltage Vdd and protect the CPU core 512 from intentional failure during a malicious attack. In operation, the auto-calibration circuit 402 auto-calibrates the dynamic variation monitor 300 of the VFSM 540 after every clock frequency Fclk or supply voltage Vdd change. The dynamic variation monitor 300 compares the updated clock frequency Fclk/supply voltage Vdd with a threshold reference calibration value to detect a malicious attack. If an attack is detected, the VFSM 540 forces a safe clock frequency Fclk to the GFMUX 532 via the force_safe_freq_sel signal and triggers a secure interrupt.

According to aspects of the present disclosure, during product test time or characterization, the VFSM 540 measures dynamic variation monitor (DVM) reference calibration codes across dynamic voltage-frequency scaling (DVFS) for the CPU core 512. Measuring of the DVM reference calibration codes across the DVFS of the CPUSS hardware 500 is performed during testing of the CPUSS hardware 500. In addition, the threshold reference calibration value for each of the measured DVM reference calibration codes are computed. The threshold reference calibration value for each of the measured DVM reference calibration codes may be computed by determining an acceptable margin from the DVM reference calibration codes.

Once the DVM reference calibration codes and the threshold reference calibration values are measured and computed, trusted software stores and programs VFSM registers with the reference calibration codes based on the clock frequency Fclk. In addition, during operation of the CPUSS 510, the voltage-frequency security monitor 400 auto-calibrates the dynamic variation monitor 300 after each clock frequency Fclk or supply voltage change and compares the updated value with a stored threshold reference calibration value. If the VFSM 540 detects an attack, the VFSM 540 forces a safe clock frequency to the GFMUX 532 via the force_safe_freq_sel signal and triggers a secure interrupt, as further described in FIG. 6.

Figure 6:
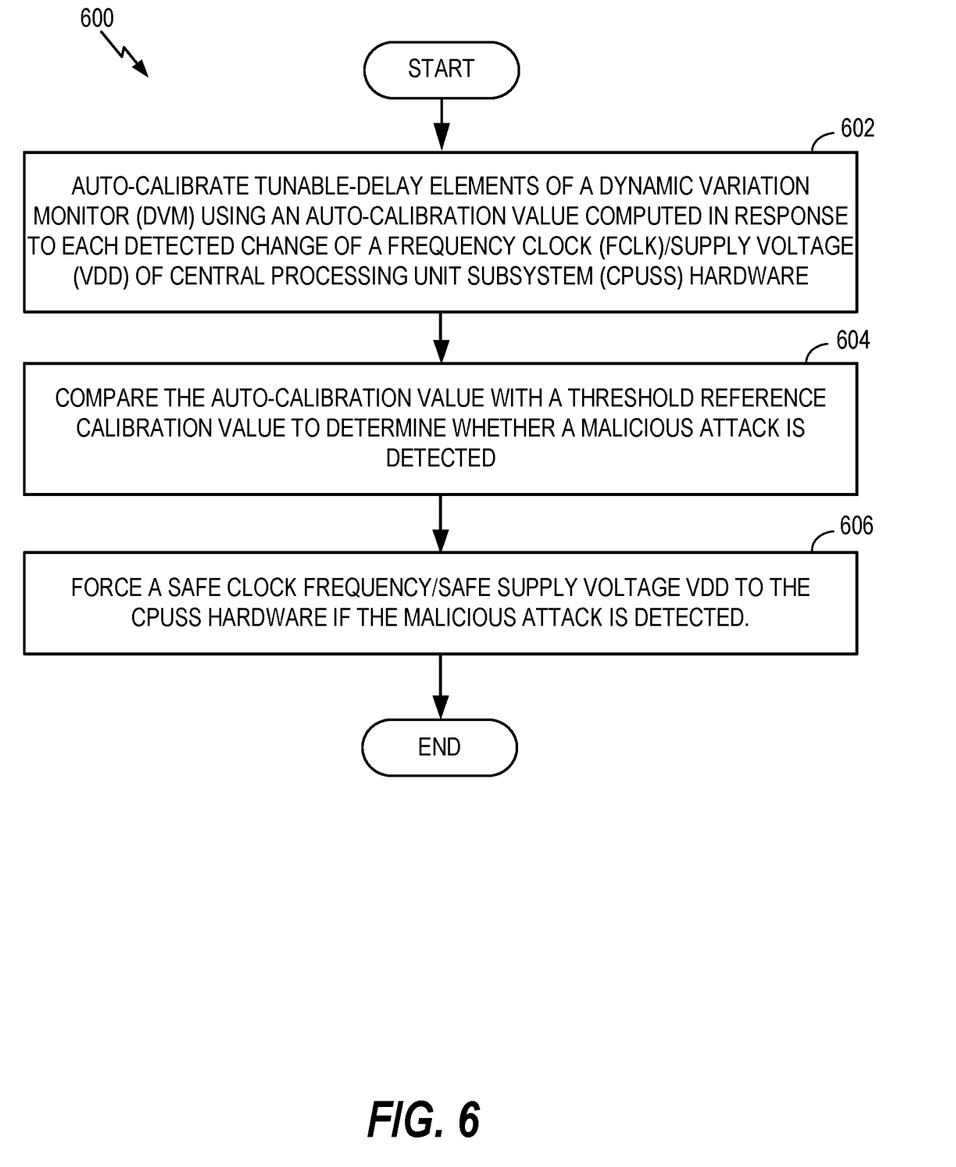
FIG. 6 is a flow diagram illustrating a method of preventing a central processing unit subsystem (CPUSS) architecture attack, according to aspects of the present disclosure.

FIG. 6 is a flow diagram illustrating a method to prevent a malicious attack on central processing unit subsystem (CPUSS) hardware, according to aspects of the present disclosure. A method 600 begins at block 602, in which tunable-delay elements of a dynamic variation monitor (DVM) are auto-calibrated using an auto-calibration value computed in response to each detected change of a clock frequency (Fclk)/supply voltage (Vdd) of the CPUSS hardware. For example, as illustrated in FIG. 4, the auto-calibration circuit 402 configures the tunable delay elements 302 of the dynamic variation monitor 300 until a zero time margin is detected based on the current operating clock frequency Fclk and the current operating supply voltage Vdd. The auto-calibration circuit 402 interfaces with the dynamic variation monitor 300 to configure the tunable delay elements 302 via a DVM input register (e.g., tde_cfg [20:0]) after a clock frequency Fclk change or a supply voltage Vdd change.

Referring again to FIG. 6, at block 604, the auto-calibration value is compared with a threshold reference calibration value to determine whether a malicious attack is detected. For example, dynamic voltage-frequency scaling (DVFS) conditions of a CPU subsystem may include a turbo mode (e.g., Vdd=0.95V & Fclk=2 GHz (Tcycle=500 ps); Buffer Delay=25 ps (depends on Vdd), and a nominal mode (e.g., Vdd=0.70V & Fclk=1 GHz (Tcycle=1,000 ps); Buffer Delay=50 ps. In this example, a DVM code may be a ratio between a cycle time (Tcycle) and a buffer delay. The DVM code for the turbo mode is twenty (20=500 ps/25 ps). In addition, the DVM code for the nominal mode is also twenty (20=1000 ps/50 ps). A DVM code threshold corresponding to the clock frequency (e.g., Fclk=2 GHz) for the turbo mode may be set to eighteen (e.g., based on the initial reference calibration value).

For example, during the turbo mode, rogue software may reduce the supply voltage Vdd (e.g., Vdd=0.95V reduced to Vdd=0.70V). The reduction in the supply voltage Vdd increases the buffer delay (e.g., 25 ps increased to 50 ps). In this example, the reduced voltage and increased buffer delay yield a substantially reduced DVM code of ten (e.g., 10=500 ps/50 ps). The DVM code threshold corresponding to the clock frequency (e.g., Fclk=2 GHz) is set to eighteen (e.g., based on the initial reference calibration value) in this example. Because the DVM code value (e.g., 10) is less than the DVM code threshold value (e.g., 18), a malicious attack is detected.

Referring again to FIG. 6, at block 606, a safe clock frequency/safe supply voltage Vdd is forced to the CPUSS hardware if the malicious attack is detected. For example, in FIG. 5, the VFSM 540 of the CPU core 512 is configured to force a safe clock frequency (e.g., force_safe_freq_sel) to the GFMUX 532 if a malicious attack is detected. The VFSM 540 may be configured to detect attempts to modify the supply voltage Vdd or clock frequency Fclk and protect the CPU core 512 from intentional failure during a detected malicious attack. If an attack is detected, the VFSM 540 forces a safe clock frequency Fclk to the GFMUX 532 via the force_safe_freq_sel signal and triggers a secure interrupt to the CPUSS hardware 500.

Figure 7:
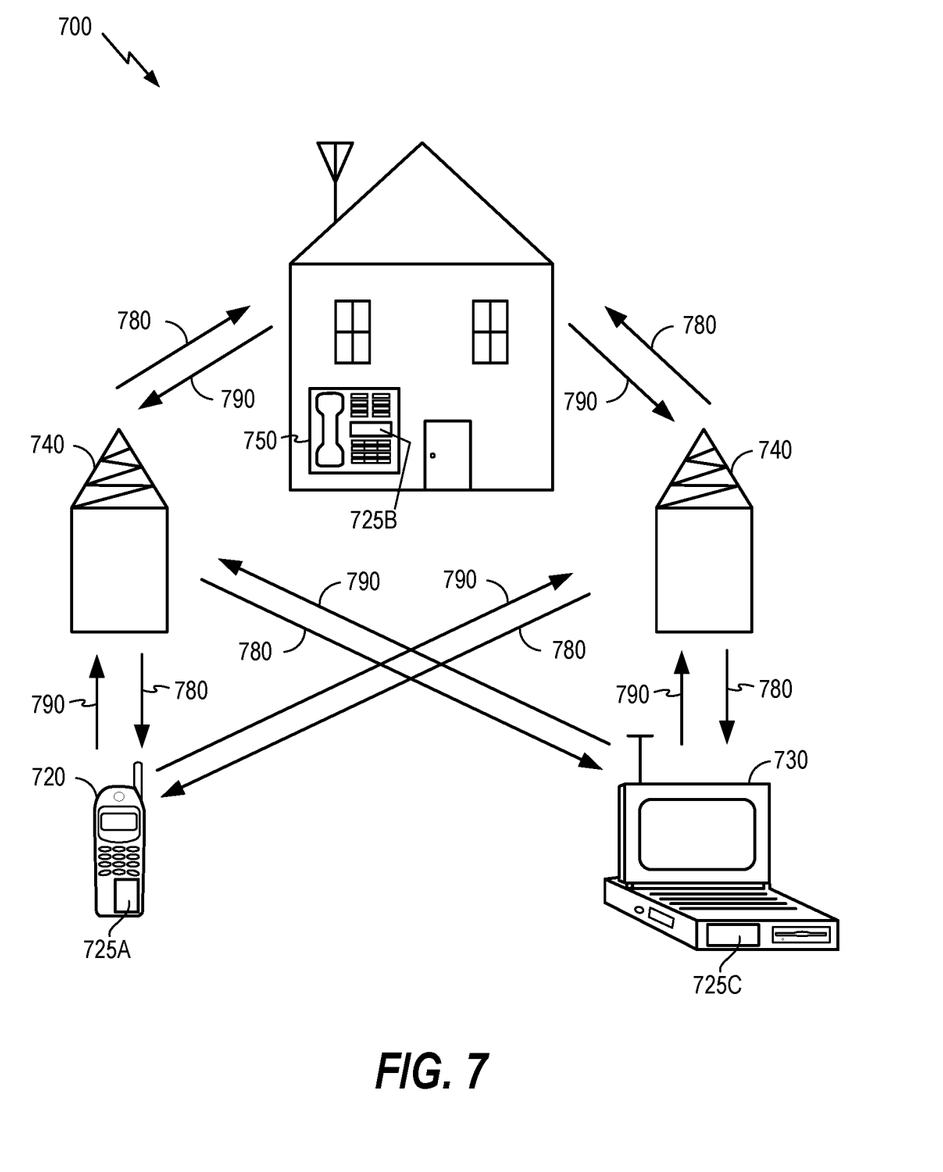
FIG. 7 is a block diagram showing a wireless communications system in which a configuration of the disclosure may be advantageously employed.

FIG. 7 is a block diagram showing an exemplary wireless communications system 700 in which a configuration of the disclosure may be advantageously employed. For purposes of illustration, FIG. 7 shows three remote units 720, 730, and 750, and two base stations 740. It will be recognized that wireless communications systems may have many more remote units and base stations. Remote units 720, 730, and 750 include integrate circuit (IC) devices 725A, 725B, and 725C, which include the disclosed VFSM circuit. It will be recognized that any device containing an IC may also include the disclosed VFSM circuit, including the base stations, switching devices, and network equipment. FIG. 7 shows forward link signals 780 from the base stations 740 to the remote units 720, 730, and 750, and reverse link signals 790 from the remote units 720, 730, and 750 to base stations 740.

In FIG. 7, a remote unit 720 is shown as a mobile telephone, a remote unit 730 is shown as a portable computer, and a remote unit 750 is shown as a fixed location remote unit in a wireless local loop system. For example, the remote units may be a mobile phone, a hand-held personal communications systems (PCS) unit, a portable data unit such as a personal data assistant, a GPS enabled device, a navigation device, a set top box, a music player, a video player, an entertainment unit, a fixed location data unit such as meter reading equipment, or any other device that stores or retrieves data or computer instructions, or any combination thereof. For example, a remote unit including the low power memory sub-system may be integrated within a vehicle control system, a server computing system, or other like system specifying critical data integrity. Although FIG. 7 illustrates IC devices 725A, 725B, and 725C, which include the disclosed VFSM circuit, the disclosure is not limited to these exemplary illustrated units. Aspects of the present disclosure may be suitably employed in any device, which includes the VFSM circuit.

For a firmware and/or software implementation, the methodologies may be implemented with modules (e.g., procedures, functions, and so on) that perform the described functions. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD) and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "a step for."

What is claimed is:

1. A method comprising:
    monitoring a clock frequency (Fclk) from a first source to subsystem hardware and a supply voltage (Vdd) from a second source to the subsystem hardware to prevent a malicious attack on the subsystem hardware;
    performing on die auto-calibrating of tunable delay elements of a dynamic variation monitor (DVM) configured to use an auto-calibration code value in response to each voltage change notification signal or each frequency change notification signal indicating change of the clock frequency (Fclk) or the supply voltage (Vdd) of the subsystem hardware;
    comparing the auto-calibration code value with a threshold reference calibration value to determine whether the malicious attack is detected; and
    changing at least one of the clock frequency (Fclk) or the supply voltage (Vdd) in the subsystem hardware to a predefined value when the malicious attack is detected.

2. The method of claim 1, further comprising triggering a secure interrupt to the subsystem hardware when the malicious attack is detected.

3. The method of claim 1, in which auto-calibrating comprises:
    adjusting the tunable delay elements of the DVM until a zero time margin is detected based on the changed clock frequency (Fclk)/supply voltage (Vdd); and
    computing the auto-calibration code value according to a value of the tunable delay elements of the DVM.

4. The method of claim 3, in which adjusting the tunable delay elements of the DVM comprises programing a DVM input register.

5. The method of claim 4, in which the DVM input register is only accessible to trusted software.

6. The method of claim 1, in which comparing comprises:
    selecting the threshold reference calibration value corresponding to the changed clock frequency (Fclk)/supply voltage (Vdd); and detecting the malicious attack if the auto-calibration code value is less than the threshold reference calibration value.

7. The method of claim 1, further comprising:
measuring DVM reference calibration codes across a dynamic voltage-frequency scaling of the subsystem hardware during testing of the subsystem hardware;
computing the threshold reference calibration value for each of the measured DVM reference calibration codes; and
storing the threshold reference calibration value for each of the measured DVM reference calibration codes in a secure storage area of the subsystem hardware.

8. A non-transitory computer-readable medium having program code recorded thereon, the program code being executed by a processor and comprising:
program code to monitor a clock frequency (Fclk) from a first source to subsystem hardware and a supply voltage (Vdd) from a second source to the subsystem hardware to prevent a malicious attack on the subsystem hardware;
program code to perform on-die auto-calibration of tunable delay elements of a dynamic variation monitor (DVM) configured to use an auto-calibration code value in response to each voltage change notification signal or each frequency change notification signal indicating change of the clock frequency (Fclk) or the supply voltage (Vdd) of the subsystem hardware;
program code to compare the auto-calibration code value with a threshold reference calibration value to determine whether the malicious attack is detected; and
program code to change at least one of the clock frequency (Fclk) or the supply voltage (Vdd) in the subsystem hardware to a predefined value when the malicious attack is detected.

9. The non-transitory computer-readable medium of claim 8, further comprising program code to trigger a secure interrupt to the subsystem hardware when the malicious attack is detected.

10. The non-transitory computer-readable medium of claim 8, in which the program code to auto-calibrate comprises:
program code to adjust the tunable delay elements of the DVM until a zero time margin is detected based on the changed clock frequency (Fclk)/supply voltage (Vdd); and
program code to compute the auto-calibration code value according to a value of the tunable delay elements of the DVM.

11. The non-transitory computer-readable medium of claim 10, in which the program code to adjust the tunable-delay elements of the DVM comprises program code to program a DVM input register after each detected change of the clock frequency (Fclk)/supply voltage (Vdd) of the subsystem hardware.

12. The non-transitory computer-readable medium of claim 11, in which the DVM input register is only accessible to trusted software.

13. The non-transitory computer-readable medium of claim 8, in which the program code to compare comprises:
program code to select the threshold reference calibration value corresponding to the changed clock frequency (Fclk)/supply voltage (Vdd); and
program code to detect the malicious attack if the auto-calibration code value is less than the threshold reference calibration value.

14. The non-transitory computer-readable medium of claim 8, further comprising:
program code to measure DVM reference calibration codes across a dynamic voltage-frequency scaling of the subsystem hardware during testing of the subsystem hardware;
program code to compute the threshold reference calibration value for each of the measured DVM reference calibration codes; and
program code to store the threshold reference calibration value for each of the measured DVM reference calibration codes in a secure storage area of the subsystem hardware.

15. A voltage-frequency security monitor (VFSM) to prevent a malicious attack on subsystem hardware, the VFSM comprising:
a component configured to monitor a clock frequency (Fclk) from a first source to the subsystem hardware and a supply voltage (Vdd) from a second source to the subsystem hardware to prevent the malicious attack on the subsystem hardware;
a dynamic variation monitor (DVM) comprising tunable delay elements;
an auto-calibration circuit configured to perform auto-calibration of the tunable delay elements of the DVM and generate an auto-calibration code value in response to each voltage change notification signal or each frequency change notification signal indicating change of the clock frequency (Fclk) or the supply voltage (Vdd) of the subsystem hardware; and
a controller configured to compare the auto-calibration code value with a threshold reference calibration value to determine whether the malicious attack is occurring, and configured to change at least one of the clock frequency (Fclk) or the supply voltage (Vdd) in the subsystem hardware to a predefined value when the malicious attack is detected.

16. The VFSM of claim 15, further in which the controller is further configured to trigger a secure interrupt to the subsystem hardware when the malicious attack is detected.

17. The VFSM of claim 15, in which the auto-calibration circuit is further configured:
to adjust the tunable delay elements of the DVM until a zero time margin is detected based on the changed clock frequency (Fclk)/supply voltage (Vdd); and
to compute the auto-calibration code value according to a value of the tunable delay elements of the DVM.

18. The VFSM of claim 15, in which the DVM comprises a DVM input register configured to store each detected change of the clock frequency (Fclk)/supply voltage (Vdd) of the subsystem hardware, in which the DVM input register is only accessible to trusted software.

19. The VFSM of claim 15, in which the controller is further configured:
to select the threshold reference calibration value corresponding to the changed clock frequency (Fclk)/supply voltage (Vdd); and
to detect the malicious attack if the auto-calibration code value is less than the threshold reference calibration value.

20. The VFSM of claim 15, in which the auto-calibration circuit is further configured:
to measure DVM reference calibration codes across a dynamic voltage-frequency scaling of the subsystem hardware during testing of the subsystem hardware;

to compute the threshold reference calibration value for each of the measured DVM reference calibration codes; and to store the threshold reference calibration value for each of the measured DVM reference calibration codes in a secure storage area of the subsystem hardware.

* * * * *